(12) United States Patent
Lee

(10) Patent No.: US 7,991,604 B2
(45) Date of Patent: Aug. 2, 2011

(54) METHOD AND APPARATUS FOR INDIRECTLY SIMULATING A SEMICONDUCTOR INTEGRATED CIRCUIT

(75) Inventor: Jae-Hoon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1010 days.

(21) Appl. No.: 11/888,535

(22) Filed: Aug. 1, 2007

(65) Prior Publication Data

US 2009/0216512 A9   Aug. 27, 2009

(30) Foreign Application Priority Data

Aug. 11, 2006  (KR) .................. 10-2006-0075951

(51) Int. Cl.
*G06F 17/50* (2006.01)
(52) U.S. Cl. .............................. 703/14; 703/13; 716/4
(58) Field of Classification Search ............... 703/13, 703/14; 716/1, 4, 5
See application file for complete search history.

(56) References Cited

U.S. PATENT DOCUMENTS

| | | | |
|---|---|---|---|
| 6,169,438 B1 * | 1/2001 | Wu et al. ..................... | 327/276 |
| 6,678,645 B1 * | 1/2004 | Rajsuman et al. ............ | 703/20 |
| 6,782,511 B1 * | 8/2004 | Frank et al. .................. | 716/1 |
| 6,996,799 B1 * | 2/2006 | Cismas et al. ................ | 717/106 |
| 7,454,323 B1 * | 11/2008 | Bain ............................. | 703/13 |
| 2002/0173942 A1 * | 11/2002 | Rajsuman et al. ............ | 703/14 |
| 2003/0217341 A1 * | 11/2003 | Rajsuman et al. ............ | 716/4 |
| 2004/0158789 A1 * | 8/2004 | Chakravarthy et al. ...... | 714/741 |

FOREIGN PATENT DOCUMENTS

| | | |
|---|---|---|
| JP | 2001-235524 | 8/2001 |
| KR | 2001-0067370 | 7/2001 |
| KR | 10-2005-0060865 | 6/2005 |

OTHER PUBLICATIONS

Riahi et al, Simulating Faults of Combinational IP Core-based SOCs in a PLI Environment, 2005, 20th IEEE International Symposium on Defect and Fault Tolerance in VLSI Systems, pp. 389-397.*

* cited by examiner

*Primary Examiner* — Paul L Rodriguez
*Assistant Examiner* — Aniss Chad
(74) *Attorney, Agent, or Firm* — Mills & Onello, LLP

(57) ABSTRACT

A method and an apparatus for indirectly simulating a semiconductor integrated circuit (IC) are described. A circle chain is formed using input pins and output pins to provide an intellectual property (IP) core model that substitutes for a real IP core circuit. A test bench for the IP core model is generated, the semiconductor IC that includes the IP core model is integrated using the generated test bench, and the semiconductor IC is simulated.

17 Claims, 6 Drawing Sheets

METHOD AND APPARATUS FOR INDIRECTLY SIMULATING A SEMICONDUCTOR INTEGRATED CIRCUIT

This application claims priority under 35 USC §119 to Korean Patent Application No. 10-2006-0075951, filed on Aug. 11, 2006 in the Korean Intellectual Property Office (KIPO), the contents of which are incorporated herein in their entirety by reference.

BACKGROUND OF THE INVENTION

1. Field of the Invention

The present invention relates to a semiconductor integrated circuit (IC), and more particularly to a method of simulating an intellectual property (IP) core included in the semiconductor IC at a system-on-chip (SoC) level.

2. Description of the Related Art

A SoC and/or an application specified integrated circuit (ASIC) design may have problems of integration errors when IP cores are integrated into the SoC/ASIC chip. Thus, expense and time for testing the SOC/ASIC design is increased. Additionally, test guides distributed to the customers with the IP cores are difficult for the customers to understand. Real net lists of the IP cores are required for testing the IP cores of the SoC/ASIC chip.

Customers may omit the test of the SoC/ASIC design because time-to-market is critical. Probability of the problems due to integration errors of the IP cores is high because the test is not performed when the customers cannot be provided with the net lists, for example, when the customers use the IP cores abroad.

Accordingly, an IP core model substituting the real IP core is required for testing the real IP core.

SUMMARY OF THE INVENTION

Accordingly, the present invention is provided to substantially obviate one or more problems due to limitations and disadvantages of the related art.

Some embodiments of the present invention provide a method of indirectly simulating a semiconductor integrated circuit (IC) by using an IP core model substituted for a real IP core.

Some embodiments of the present invention provide an apparatus for indirectly simulating a semiconductor integrated circuit (IC) by using an IP core model substituted for a real IP core.

Some embodiments of the present invention provide a method of testing an IP core of a semiconductor IC by using an IP core model substituted for the real IP core.

According to a first aspect, the present invention is directed to a method of indirectly simulating a semiconductor IC includes forming a circle chain using input pins and output pins to provide an IP core model that is substituted for a real IP core circuit, generating a test bench for the IP core model, integrating the semiconductor IC that includes the IP core model using the generated test bench, and simulating the semiconductor IC.

In some embodiments, the input pins and the output pins of the IP core model respectively correspond to input pins and output pins of the real IP core circuit that is integrated in the semiconductor IC, in which the input pins and the output pins of the real IP core circuit are to be tested.

In some embodiments, the IP core model includes a first input pin and a second input pin that respectively receive a first input signal and a second input signal, a third input pin that receives an enable signal, a fourth input pin that receives a test mode signal, a fifth input pin that receives a clock signal, and at least one output pin that outputs an output signal.

In some embodiments, an operation mode of the IP core model is divided into two modes in response to the enable signal. The operation mode of the IP core model may include a propagation mode and a circle shift mode. The operation mode corresponds to the propagation mode when the enable signal is disabled, and the operation mode corresponds to the circle shift mode when the enable signal is enabled. The output signal may be outputted through the output pin and passes through the circle chain that is open when the operation mode corresponds to the propagation mode. The output signal may be outputted through the output pin and passes through the circle chain that is closed when the operation mode corresponds to the circle shift mode.

In some embodiments, the IP core model includes a first logic module, a first select module, a second select module, a first delay module, a second delay module, a second logic module, a third select module, and a third delay module. The first logic module receives the enable signal and the test mode signal to output a select signal. The first select module receives the first input signal and a first feedback signal, and selects one of the first input signal and the first feedback signal in response to the select signal. The second select module receives the second input signal and a second feedback signal, and selects one of the second input signal and the second feedback signal in response to the select signal. The first delay module delays a first selected signal provided from the first select module to output a first delayed signal in response to the clock signal. The second delay module delays a second selected signal provided from the second select module to output a second delayed signal in response to the clock signal. The second delayed signal corresponds to the first feedback signal. The second logic module receives the first delayed signal and the second delayed signal to output an AND signal. The third select module receives the AND signal and the first delayed signal to select one of the AND signal and the first delayed signal in response to the select signal. The third delay module delays a third selected signal provided from the third select module to output a third delayed signal in response to the clock signal. The third delayed signal corresponds to the second feedback signal.

In some embodiments, the first through third select modules correspond to a 2-to-1 multiplexer. The first and second logic modules may correspond to an AND gate. The first through third delay modules may correspond to a D flip-flop. The D flip-flops may be triggered in synchronization with rising edges of the clock signal.

According to another aspect, the present invention is directed to an apparatus for indirectly simulating a semiconductor integrated circuit (IC) which includes a modeling tool, a test bench generator, an integrator, and a simulator. The modeling tool forms a circle chain using input pins and output pins to provide an intellectual property (IP) core model that is substituted for a real IP core circuit. The test bench generator generates a test bench for the IP core model. The integrator integrates the semiconductor IC that includes the IP core model using the generated test bench. The simulator simulates the integrated semiconductor IC at a system-on-chip (SoC) level.

In some embodiments, wherein the input pins and the output pins of the IP core model may respectively correspond to input pins and output pins of the real IP core circuit that is integrated in the semiconductor IC, in which the input pins and the output pins of the real IP core circuit are to be tested.

In some embodiments, the IP core model includes a first input pin and a second input pin that respectively receive a first input signal and a second input signal, a third input pin that receives an enable signal, a fourth input pin that receives a test mode signal, a fifth input pin that receives a clock signal, and at least one output pin that outputs an output signal.

In some embodiments, an operation mode of the IP core model is divided into two modes in response to the enable signal.

In some embodiments, the IP core model includes a first logic circuit, a first select circuit, a second select circuit, a first delay circuit, a second delay circuit, a second logic circuit, a third select circuit, and a third delay circuit. The first logic circuit receives the enable signal and the test mode signal to output a select signal. The first select circuit receives the first input signal and a first feedback signal, and selects one of the first input signal and the first feedback signal in response to the select signal. The second select circuit receives the second input signal and a second feedback signal, and selects one of the second input signal and the second feedback signal in response to the select signal. The first delay circuit delays a first selected signal provided from the first select circuit to output a first delayed signal in response to the clock signal. The second delay circuit delays a second selected signal provided from the second select circuit to output a second delayed signal in response to the clock signal. The second delayed signal corresponds to the first feedback signal. The second logic circuit receives the first delayed signal and the second delayed signal to output an AND signal. The third select circuit receives the AND signal and the first delayed signal to select one of the AND signal and the first delayed signal in response to the select signal. The third delay circuit delays a third selected signal provided from the third select circuit to output a third delayed signal in response to the clock signal. The third delayed signal corresponds to the second feedback signal.

In some embodiments, the first through third select circuits correspond to a 2-to-1 multiplexer. The first and second logic circuits may correspond to an AND gate. The first through third delay circuits may correspond to a D flip-flop. The D flip-flops may be triggered by rising edges of the clock signal.

According to another aspect, the present invention is directed to a method of testing an intellectual property (IP) core of a semiconductor integrated circuit (IC), which includes providing an IP core model including a circle chain that includes an input module and an output module, generating a test bench for the IP core model, integrating the semiconductor IC that includes the IP core model using the generated test bench, simulating the semiconductor IC, and determining a normal operation of the real IP core circuit based on a result of the simulation of the IP core model.

In some embodiments, the input module of the IP core model includes first through fourth input select modules and first through fourth input delay modules. The first through fourth input select modules have first input ports and second input ports. The first input ports receive input signals. The first through fourth input delay modules receive first selected signals provided from the first through fourth input select modules to output first delayed signals synchronously with a clock signal. The second input port of the third input select module receives the first delayed signal provided from the fourth input delay module. The second input port of the second input select module receives the first delayed signal provided from the third input delay module. The second input port of the first input select module receives the first delayed signal provided from the second input delay module.

In some embodiments, the output module of the IP core model includes first through third output select modules and first through third output delay modules. The first through third output select modules have third input ports and fourth input ports. The third input ports receive the first delayed signals provided from the first through third input delay modules. The first through third output delay modules receive second selected signals provided from the first through third output select modules to output second delayed signals synchronously with the clock signal. The fourth input port of the second output select module receives the second delayed signal provided from the first output delay module. The fourth input port of the third output select module receives the second delayed signal provided from the second output delay module. The second input port of the fourth input select module receives the second delayed signal provided from the third output delay module. The fourth input port of the first output select module receives the first delayed signal provided from the first input delay module.

In some embodiments, the IP core model further includes a logic module that provides a select signal to the input select modules and the output select modules based on an enable signal and a test mode signal.

In some embodiments, the select signal may correspond to a result of an AND operation on the enable signal and the test mode signal.

In some embodiments, an operation mode of the IP core model is divided into two modes in response to the select signal.

In some embodiments, the operation mode of the IP core model corresponds to a propagation mode when the select signal is disabled. Output signals are outputted through the output pins and pass through the circle chain that is open when the operation mode corresponds to the propagation mode. The output signals correspond to the second selected signals.

In some embodiments, the operation mode of the IP core model may corresponds to a circle shift mode when the select signal is enabled. The output signals are outputted through the output pins and pass through the circle chain that is closed when the operation mode corresponds to the circle shift mode. The output signals correspond to the second selected signals.

Accordingly, the method and the apparatus of indirectly simulating the semiconductor IC according to example embodiments of the present invention test the semiconductor IC quickly and with low expense.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE EMBODIMENTS

Figure 1:
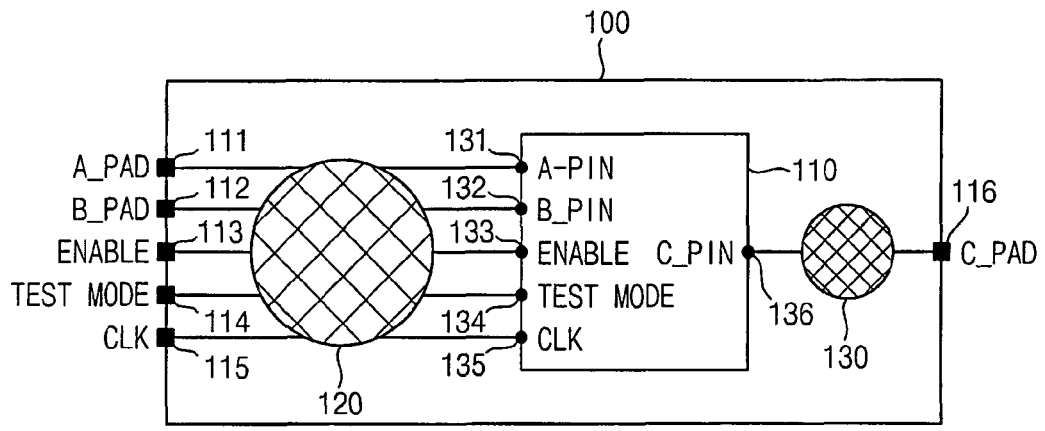
FIG. 1 is a block diagram illustrating a semiconductor integrated circuit (IC) including a real IP core circuit at a system-on-chip (SoC) level.

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a semiconductor integrated circuit (IC) including a real IP core circuit at a system-on-chip (SoC) level.

The semiconductor IC 100 includes input pads 111 through 115, an output pad 116, an IP core circuit 110, and logic circuits 120 and 130.

The IP core circuit 110 includes input pins 131 through 135, and an output pin 136. Input signals are provided to the IP core circuit 110 by passing through input pads 111 through 115, the logic circuit 120, and the input pins 131 through 135. Output signals are provided from the IP core circuit 110 to an external device by passing through an output pin 136, the logic circuit 130, and the output pad 116. Reduction of simulation load and time cost is required when the semiconductor IC 100 is simulated at SoC level.

Figure 2:
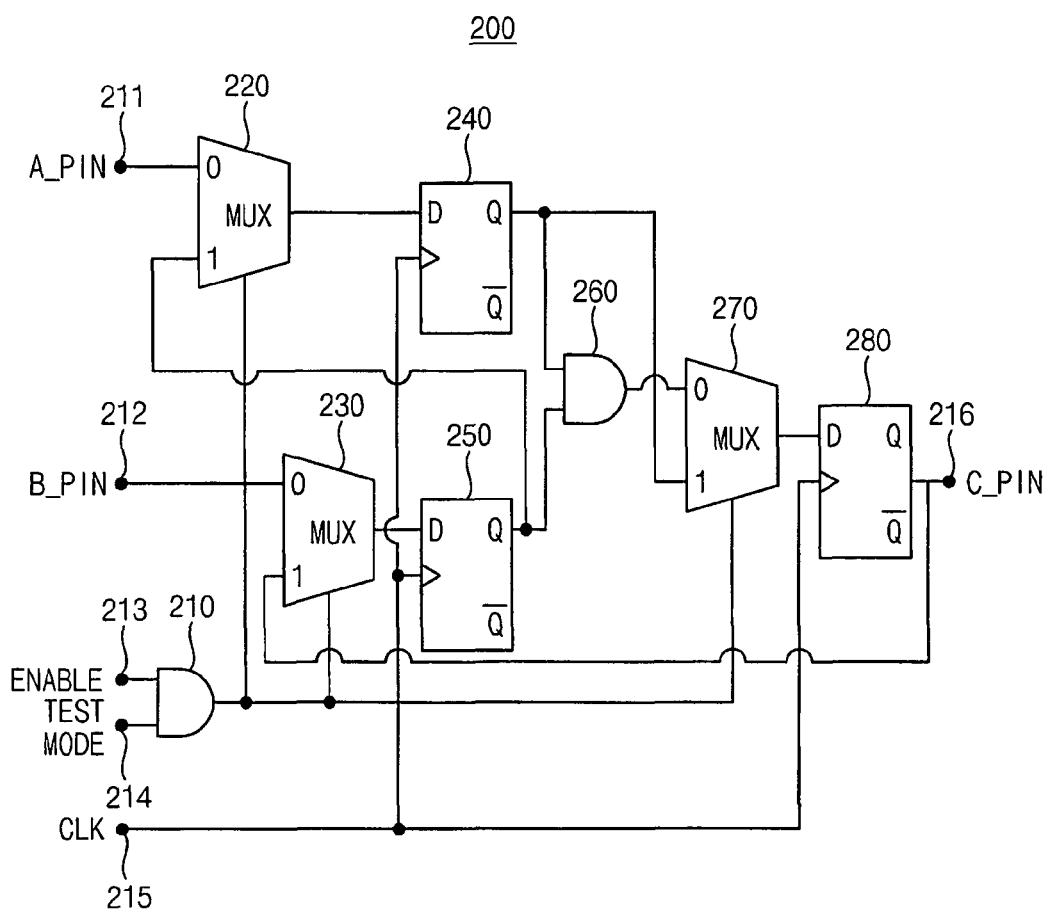
FIG. 2 is a block diagram illustrating a structure of an IP core model substituted for the real IP core circuit.

FIG. 2 is a block diagram illustrating a structure of an IP core model substituted for the real IP core circuit.

Figure 3:
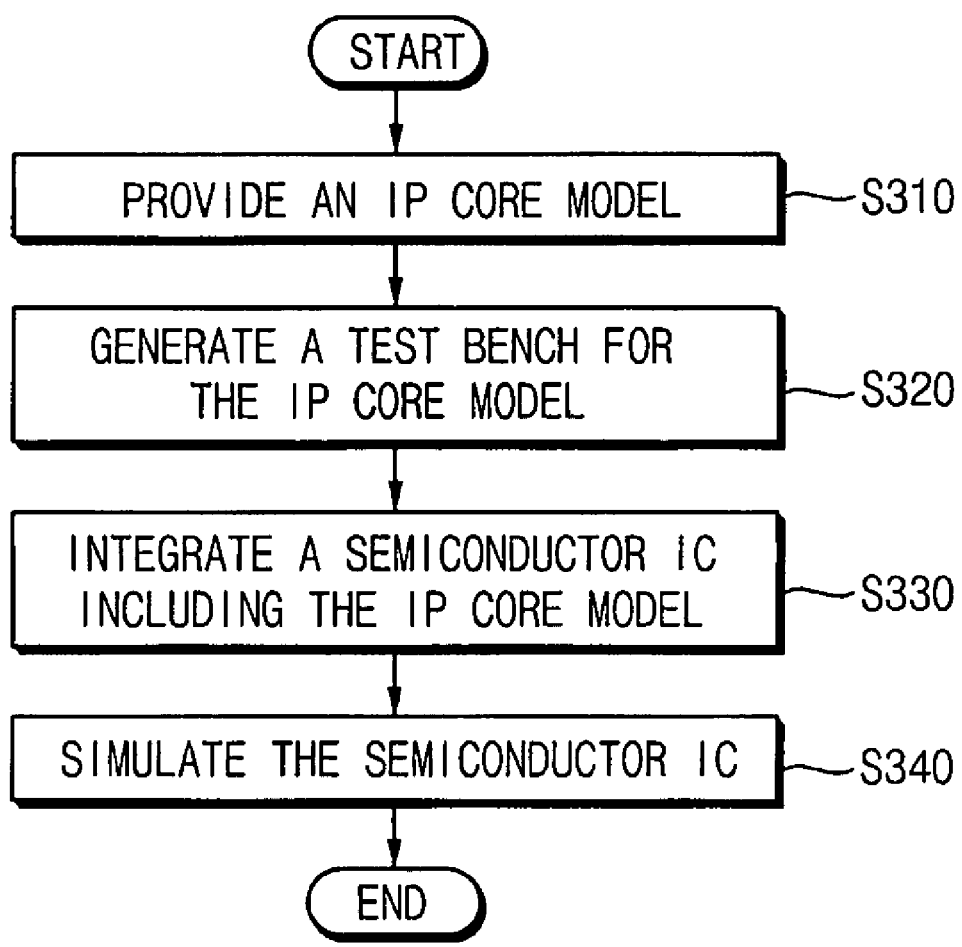
FIG. 3 is a flow chart illustrating a method of indirectly simulating the semiconductor IC according to an example embodiment of the present invention.

FIG. 3 is a flow chart illustrating a method of indirectly simulating the semiconductor IC according to an example embodiment of the present invention.

Referring to FIG. 3, according to the method of indirectly simulating the semiconductor IC, an IP core model 300 is provided (step S310), which substitutes for the real IP core circuit, by forming a circle chain with input pins and output pins. A test bench for the IP core model 300 is generated (step S320), and the semiconductor IC that includes the IP core model 300 is integrated using the generated test bench (step S330). The integrated semiconductor IC is simulated (step S340). The IP core model 300 of FIG. 3 may be the IP core model 200 of FIG. 2.

Referring to FIG. 2, the IP core model 200 includes input pins 211 through 215 and an output pin 216. The input pins 211 through 215 of FIG. 2 respectively correspond to the input pins 131 through 135 of FIG. 1. The output pin 216 of the IP core model 200 corresponds to the output pin 136 of FIG. 1. The number of output pins of FIG. 2 may be more than two. Additionally, input pads may be larger in quantity than the input pins. The first input pin 211 and the second input pin 212 may receive input signals, and the third input pin 213 may receive an enable signal. The fourth input pin 214 may receive a test mode signal, and the fifth input pin 215 may receive a clock signal CLK.

The IP core model 200 includes a first logic module 210, a first select module 220, a second select module 230, a first delay module 240, a second delay module 250, a second logic module 260, a third select module 270, and a third delay module 280. The output pin 216 is connected to an output port of the third delay module 280. The select modules 220, 230 and 270 may correspond to 2-to-1 multiplexers. The logic modules 210 and 260 may correspond to AND gates. The delay modules 240, 250 and 280 may correspond to D flip-flops. Each module of FIG. 2 may be implemented with other elements that perform the same operation.

The first select module 220 receives the first input signal and a second delayed signal that is provided from the second delay module 250. Additionally, the first select module 220 selects one of the first input signal and the second delayed signal to output a first selected signal based on a select signal. The second select module 230 receives the second input signal and a third delayed signal that is provided from the third delay module 280. Additionally, the second delay module 250 selects one of the second input signal and the third delayed signal to output a second selected signal based on the select signal.

The first delay module 240 receives the first selected signal. The first delay module 240 outputs a first delayed signal synchronously with a rising edge of the clock signal CLK. The second delay module 250 receives a second selected signal. The second delay module 250 outputs the second delay signal synchronously with the rising edge of the clock signal CLK. Additionally, the first select module 220 receives the second delayed signal. The second logic module 260 outputs an AND signal that is a result of an AND operation on the first delayed signal and the second delayed signal. The third select module 270 receives the first delayed signal and the AND signal. Additionally, the third select module 270 selects one of the first delayed signal and the AND signal to output a third selected signal based on the select signal. The third delay module 280 receives the third selected signal. The third delay module 280 outputs the third delayed signal synchronously with the rising edge of the clock signal CLK. The third delayed signal is outputted at the output pin 216. Additionally, the second select module 230 receives the third delayed signal.

For example, the first, second and third select modules 220, 230 and 270 may have two input ports, respectively. The select signal determines which port is selected to be open. The first ports may be selected when the select signal is disabled, and the second ports may be selected when the select signal is enabled.

A state of the select signal is changed in response to the enable signal when the test mode signal that is provided to the first logic module 210 is in a high state.

When the select signal is disabled because the enable signal is disabled, signals that are provided to the first input ports in select modules 220, 230 and 270 are selected. The first select module 220 selects the first input signal that is provided to the first input port of the first select module 220. The second select module 230 selects the second input signal that is provided to the first input port of the second select module 230. The first delay module 240 delays the first input signal by half clock interval at rising edges of the clock signal to output the first delayed signal. The second delay module 250 delays the second input signal by half clock interval at rising edges of the clock signal to output the second delayed signal. The second logic module 260 outputs the AND signal that is enabled when the first delayed signal and the second delayed signal are in high state. The third delay module 280 delays the AND signal that is provided through the third select module 270 by half clock interval at rising edges of the clock signal to output the third delayed signal through the output pin 216.

When the select signal is enabled because the enable signal is enabled, signals that are provided to the second input ports in select modules 220, 230 and 270 are selected. The first select module 220 selects the second delayed signal provided from the second delay module 250 to the second input port of the first select module 220. The second select module 230 selects the third delayed signal provided from the third delay module 280 to the second input port of the second select module 220. Here, the third delayed signal is a result of AND operation on the delayed input signals by one clock interval at rising edges of the clock signal. Therefore, the output signal is shifted when the select signal is enabled. Accordingly, the output signal is outputted once, or the output signal is outputted and shifted, based on the select signal. That is, an operation mode of the IP core model may be divided into a propagation mode and a circle shift mode. In the propagation mode, the output signal is provided once when the input signals are provided through the output pin because the circle chain is open. Thus, the output signal is not shifted. In the circle shift mode, the output signal is provided from the output pin and the output signal is fed back to the second select module 230 to pass through the second select module 230 instead of the second input signal because the circle chain is closed. Thus, the output signal is shifted. Additionally, the second delayed signal provided from the second delay module 250 is fed back to the first select module 220 and passes through the first select module 220 instead of the first input signal.

In some embodiments, the select modules 220, 230 and 270 may be configured to select the first input port to be open when the enable signal is enabled. Also, the delay modules 240, 250 and 280 may operate at falling edges of the clock signal. Additionally, the IP core model 200 may be modified such that the numbers of the input signals and the output signals may be increased.

Figure 4:
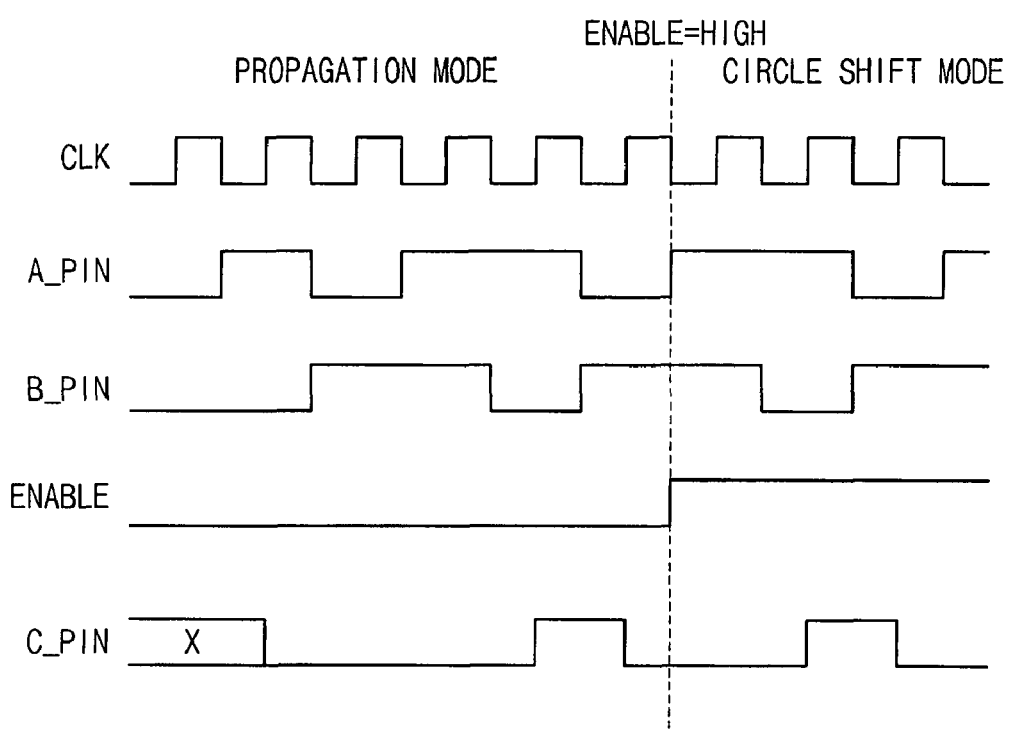
FIG. 4 is a timing diagram illustrating an operation on the IP core model of FIG. 2.

FIG. 4 is a timing diagram illustrating an operation on the IP core model of FIG. 2. CLK, A_PIN, B_PIN, ENABLE, and C_PIN respectively represent the clock signal, the first input signal, the second input signal, the enable signal, and the output signal. In addition, the test mode signal is assumed to be in a high state in FIG. 4.

Referring to FIG. 4, the operation mode of the IP core model is changed in response to the enable signal. Therefore, the input signals pass through from the input pins to the output pin once when the enable signal is disabled. However, the output signal is shifted to the second select module 230 and passes through from the second select module 230 to the output pin when the enable signal is enabled, as described in operation of the IP core model of FIG. 2.

Figure 5:
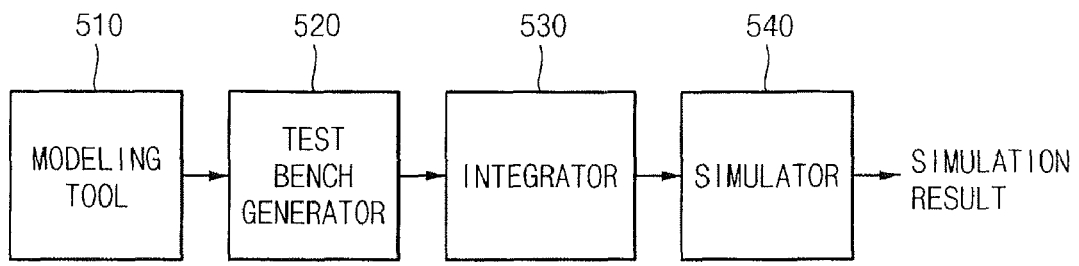
FIG. 5 is a block diagram illustrating an apparatus for indirectly simulating a semiconductor integrated circuit (IC) according to an example embodiment of the present invention.

FIG. 5 is a block diagram illustrating an apparatus for indirectly simulating a semiconductor integrated circuit (IC) according to an example embodiment of the present invention.

Referring to FIG. 5, the apparatus 500 for indirectly simulating the semiconductor IC according to an example embodiment of the present invention includes a modeling tool 510, a test bench generator 520, an integrator 530, and a simulator 540.

The modeling tool 510 provides the IP core model of FIG. 2. The IP core model substitutes for a real IP core circuit by using a circle chain by using input pins and output pins. A structure of the IP core model provided from the modeling tool 510 is the same as the structure of the IP core model of FIG. 2. The test bench generator 520 generates a test bench for the IP core model. The integrator 530 integrates the semiconductor IC that includes the IP core model by using the generated test bench. The simulator 540 outputs a result of simulating the integrated semiconductor IC at the SoC level. The integration of the real IP core circuit may be verified fast and correctly based on the result of the simulation.

Figure 6:
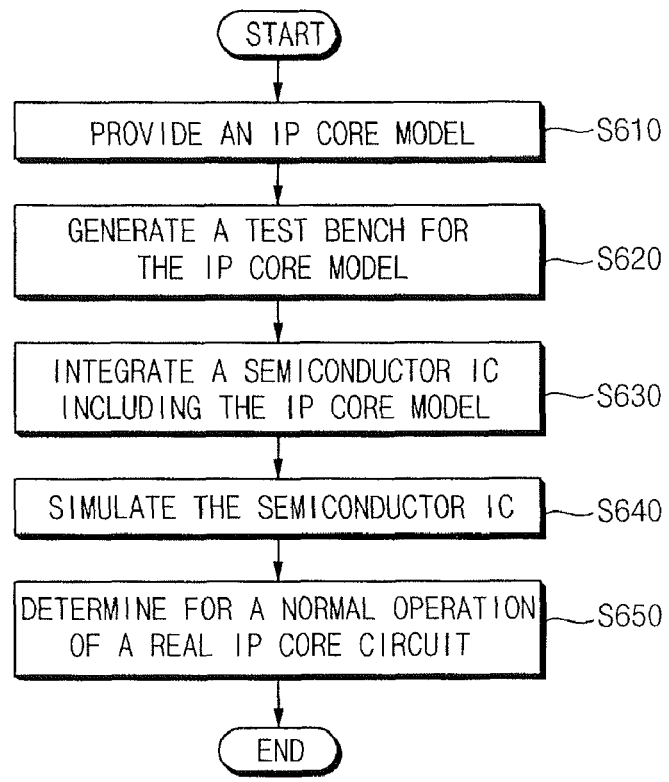
FIG. 6 is a flow chart illustrating a method of testing an IP core of a semiconductor IC according to an example embodiment of the present invention.

FIG. 6 is a flow chart illustrating a method of testing an IP core of a semiconductor IC according to an example embodiment of the present invention.

Referring to FIG. 6, according to the method of testing an IP core of a semiconductor IC, an IP core model including a circle chain that includes an input module and an output module is provided (step S610), and a test bench for the IP core model is generated (step S620). The semiconductor IC that includes the IP core model is integrated using the test bench (step S630). The integrated semiconductor IC is simulated (step S640) so as to determine a normal operation of the real IP core circuit based on a result of the simulation of the IP core model (step S650).

Figure 7:
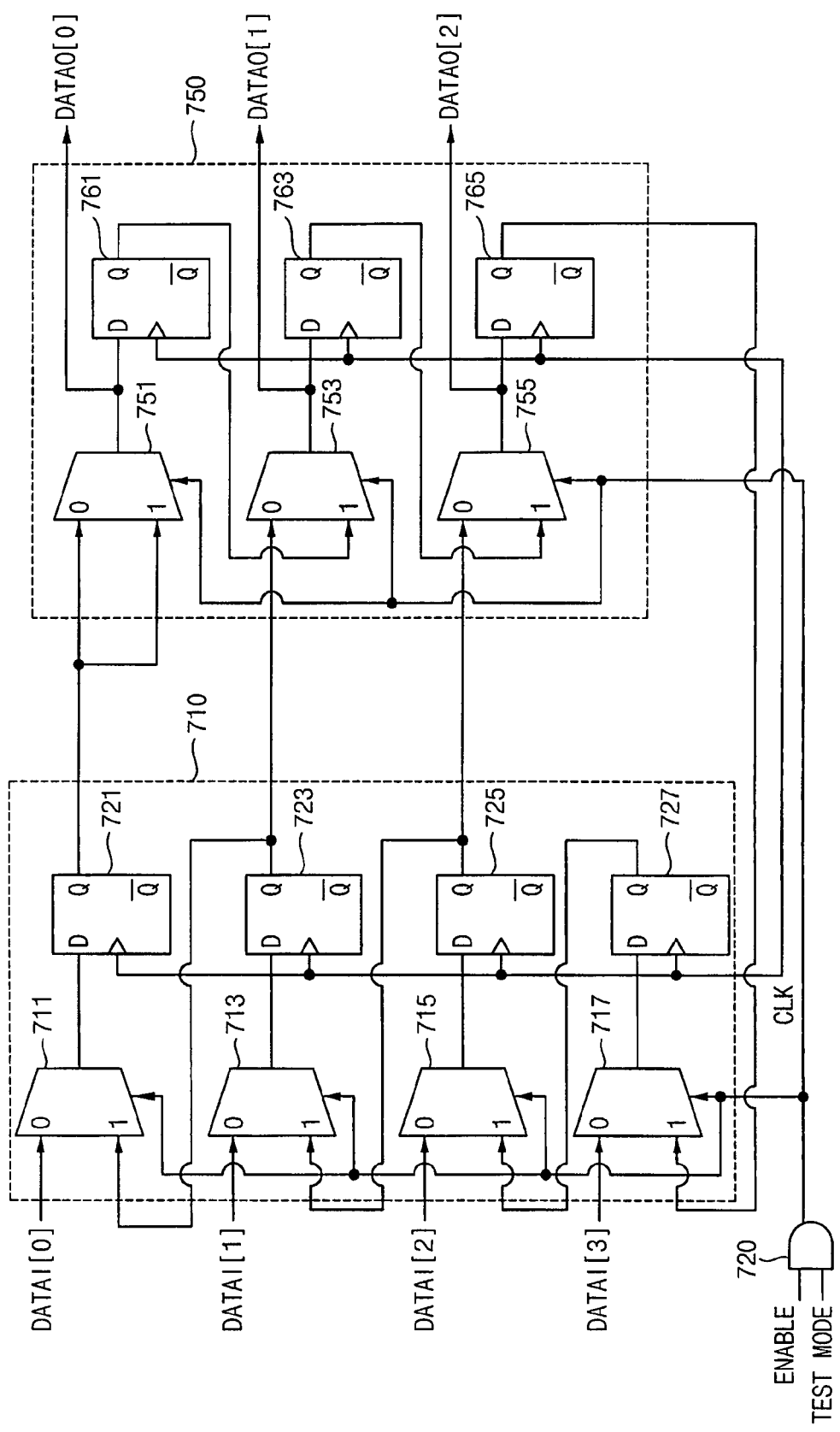
FIG. 7 is a block diagram illustrating a structure of the IP core model provided by the method of testing the IP core of FIG. 6.

FIG. 7 is a block diagram illustrating a structure of the IP core model provided in the method of testing the IP core of FIG. 6.

Referring to FIG. 7, the IP core model provided in the method of testing the IP core of FIG. 6 includes the input module 710, the output module 750, and a logic module 720.

The input module 710 includes first through fourth input select modules 711, 713, 715 and 717, and first through fourth input delay modules 721, 723, 725 and 727. The input select modules 711, 713, 715 and 717 each include a first input port, a second input port and a select port. The input select modules 711, 713, 715 and 717 receive select signals provided from the logic module 720 through the select ports. The input select modules 711, 713, 715 and 717 respectively receive input signals DataI[0], DataI[1], DataI[2] and DataI[3] through the first input ports. The select signal is a result of an AND operation on an enable signal and a test mode signal. The input select modules 711, 713, 715 and 717 select one of the two input ports to be open in response to the select signal.

The input select modules 711, 713, 715 and 717 output first selected signals to provide the first selected signals to the input delay modules 721, 723, 725 and 727. The input delay modules 721, 723, 725 and 727 delay the first selected signals by half clock interval at rising edges of a clock signal to output first delayed signals. The first input select module 711 receives the first delayed signal provided from the second input delay module 723 through the second input port of the first input select module 711. The second input select module 713 receives the first delayed signal provided from the third input delay module 725 through the second input port of the second input select module 713. The third input select module 715 receives the first delayed signal provided from the fourth input delay module 727 through the second input port of the third input select module 715. Each of the input select modules 711, 713, 715 and 717 may be a 2-to-1 multiplexer. Each of the input delay modules 721, 723, 725 and 727 may be a D flip-flop. Each input module of FIG. 7 may be implemented with other elements that perform the same operation.

The output module 750 includes first through third output select modules 751, 753 and 755, and first through third output delay modules 761, 763 and 765. The output select modules 751, 753 and 755 include third input ports, fourth input ports and a select port. The output select modules 751, 753 and 755 select one of the two input ports to be open in response to the select signal. The output select modules 751, 753 and 755 respectively receive the first delayed signals provided from the first through third input delay modules 721, 723 and 725 through the third input ports. The first output select module 751 receives the first delayed signal provided from the first delay module 721 through the fourth input port of the first output select module 751. The output select modules 751, 753 and 755 provide output signals DataO[0], DataO[1], and DataO[2] corresponding to second selected signals.

The output delay modules 761, 763 and 765 delay the second selected signals by half clock interval at rising edges of the clock signal to output second delayed signals. The second output select module 753 receives the second delayed signal provided from the first output delay module 761 through the fourth input port of the second output select module 753. The third output select module 755 receives the second delayed signal provided from the second output delay module 763 through the fourth input port of the third output select module 755. The fourth input select module 717 receives the second delayed signal provided from the third output delay module 765 through the fourth input port of the fourth input select module 717. Each of the output select modules 751, 753 and 755 may be a 2-to-1 multiplexer. Each of the output delay modules 761, 763 and 765 may be a D flip-flop. Each output module of FIG. 7 may be implemented with other elements that perform the same operation.

Figure 8:
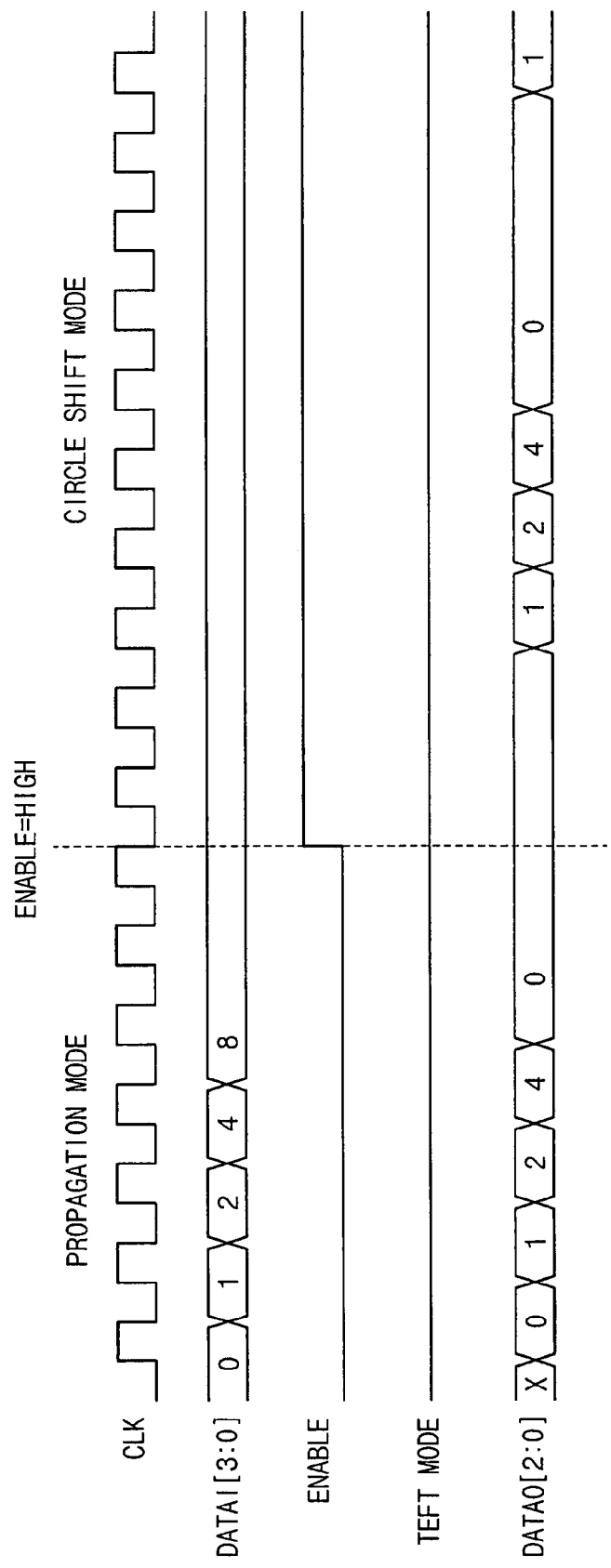
FIG. 8 is a timing diagram illustrating an operation of the IP core model of FIG. 7.

FIG. 8 is a timing diagram illustrating operation of the IP core model of FIG. 7.

The operation of the IP core model will be described with reference to FIGS. 7 and 8.

For example, the logic module 720 may output the select signal in a low state when the test mode signal is enabled and the enable signal is disabled. In this case, the first through fourth input select modules 711, 713, 715 and 717 respectively select the input signals DataI[0], DataI[1], DataI[2] and DataI[3] that pass through the first input ports. The input delay modules 721, 723, 725 and 727 delay the first selected signals provided from the input select modules 711, 713, 715 and 717 by half clock interval at rising edges of the clock signal. The first through third output select modules 751, 753 and 755 respectively select the first delayed signals provided from the first through third input delay modules 721, 723 and 725, and output the output signals DataO[0], DataO[1], and DataO[2]. Here, input signals are 4-bit signals and the output signals are 3-bit signals because the output module does not receive the first delayed signal provided from the fourth delay module 727. Therefore, the input signals propagate through the input module and the output module, and the output signals provided from the output module are results of the propagation of the input signals, when the enable signal is disabled, that is, the IP core model operates in propagation mode.

When the test mode signal is enabled and the enable signal is enabled, the logic module 720 may output the select signal in high state. In this case, the first through fourth input select modules 711, 713, 715 and 717 respectively select the second input port to be open. The fourth input select module 717 receives the second delayed signal provided from the third output delay module 765. The select modules and the delay modules of the input module and the output module are wired in a "circle chain". Thus, the output select modules output the output signals with delay of seven-clock interval with respect to the previous output signals. Here, seven is the number of the delay modules included in the IP core model as illustrated in FIG. 8. When the IP core model operates in circle shift mode, the output signals are shifted to the input module to output the delayed output signals. Therefore, the integration of the real IP core circuit may be tested using the IP core model instead of the real IP core circuit. A number of the modules included in the IP core model is smaller than a number of logic gates included in the real IP core circuit. Therefore, time for testing the integration of a semiconductor IC including the IP core model is smaller than time for testing the integration of a semiconductor IC including the real IP core circuit at the SoC level.

As described above, a method and an apparatus for indirectly simulating a semiconductor IC and a method of testing IP core of the semiconductor IC use an IP core model instead of a real IP core circuit in the semiconductor IC. Additionally, an integration of the semiconductor IC may be correctly and quickly verified with low load by integrating the semiconductor IC including the IP core model.

While the example embodiments of the present invention and their advantages have been described in detail, it should be understood that various changes, substitutions and alterations may be made herein without departing from the scope of the invention.

What is claimed is:

1. A method of indirectly simulating a semiconductor integrated circuit (IC), the method comprising:
    forming a circle chain using input pins and output pins to provide an intellectual property (IP) core model that is substituted for a real IP core circuit, wherein the circle chain comprises logic modules, select modules and delay modules and wherein forming the circle chain comprises coupling a first output pin to a first select module;

generating a test bench for the IP core model;
integrating the semiconductor IC that includes the IP core model using the generated test bench; and
simulating the semiconductor IC,
wherein the input pins and the output pins of the IP core model respectively correspond to input pins and output pins of the real IP core circuit that is integrated in the semiconductor IC, wherein the input pins and the output pins of the real IP core circuit are to be tested, and
wherein the IP core model includes a first input pin and a second input pin that respectively receive a first input signal and a second input signal, a third input pin that receives an enable signal, a fourth input pin that receives a test mode signal, a fifth input pin that receives a clock signal and at least one output pin that outputs an output signal.

2. The method of claim 1, wherein an operation mode of the IP core model is divided into two modes in response to the enable signal.

3. The method of claim 2, wherein the operation mode of the IP core model includes a propagation mode and a circle shift mode, the operation mode corresponding to the propagation mode when the enable signal is disabled, the operation mode corresponding to the circle shift mode when the enable signal is enabled.

4. The method of claim 3, wherein the output signal is outputted through the output pin and passes through the circle chain that is open when the operation mode corresponds to the propagation mode.

5. The method of claim 4, wherein the output signal is outputted through the output pin and passes through the circle chain that is closed when the operation mode corresponds to the circle shift mode.

6. The method of claim 1, wherein the IP core model comprises:
a first logic module that receives the enable signal and the test mode signal to output a select signal;
a second select module that receives the first input signal and a first feedback signal, and selects one of the first input signal and the first feedback signal in response to the select signal;
the first select module that receives the second input signal and a second feedback signal from the first output pin, and selects one of the second input signal and the second feedback signal in response to the select signal;
a first delay module that delays a first selected signal provided from the second select module to output a first delayed signal in response to the clock signal;
a second delay module that delays a second selected signal provided from the first select module to output a second delayed signal in response to the clock signal, the second delayed signal corresponding to the first feedback signal;
a second logic module that receives the first delayed signal and the second delayed signal to output an AND signal;
a third select module that receives the AND signal and the first delayed signal to select one of the AND signal and the first delayed signal in response to the select signal; and
a third delay module that delays a third selected signal provided from the third select module to output a third delayed signal in response to the clock signal, the third delayed signal corresponding to the second feedback signal.

7. The method of claim 6, wherein the first through third select modules correspond to a 2-to-1 multiplexer.

8. The method of claim 6, wherein the first and second logic modules correspond to an AND gate.

9. The method of claim 6, wherein the first through third delay modules correspond to a D flip-flop.

10. The method of claim 9, wherein the D flip-flops are triggered in synchronization with rising edges of the clock signal.

11. An apparatus for indirectly simulating a semiconductor integrated circuit (IC), the apparatus comprising:
a modeling tool configured to form a circle chain using input pins and output pins to provide an intellectual property (IP) core model that is substituted for a real IP core circuit, wherein the circle chain comprises logic circuits, select circuits and delay circuits and wherein a first output pin is coupled to a first select circuit such that the circle chain is formed;
a test bench generator configured to generate a test bench for the IP core model;
an integrator configured to integrate the semiconductor IC that includes the IP core model using the generated test bench; and
a simulator configured to simulate the integrated semiconductor IC at System on Chip (SoC) level,
wherein the input pins and the output pins of the IP core model respectively correspond to input pins and output pins of the real IP core circuit that is integrated in the semiconductor IC, wherein the input pins and the output pins of the real IP core circuit are to be tested, and
wherein the IP core model includes a first input pin and a second input pin that respectively receive a first input signal and a second input signal, a third input pin that receives an enable signal, a fourth input pin that receives a test mode signal, and a fifth input pin that receives a clock signal, and at least one output pin that outputs an output signal.

12. The apparatus of claim 11, wherein an operation mode of the IP core model is divided into two modes in response to the enable signal.

13. The apparatus of claim 11, wherein the IP core model comprises:
a first logic circuit that receives the enable signal and the test mode signal to output a select signal;
a second select circuit that receives the first input signal and a first feedback signal, and selects one of the first input signal and the first feedback signal in response to the select signal;
the first select circuit that receives the second input signal and a second feedback signal from the first output pin, and selects one of the second input signal and the second feedback signal in response to the select signal;
a first delay circuit that delays a first selected signal provided from the second select circuit to output a first delayed signal in response to the clock signal;
a second delay circuit that delays a second selected signal provided from the first select circuit to output a second delayed signal in response to the clock signal, the second delayed signal corresponding to the first feedback signal;
a second logic circuit that receives the first delayed signal and the second delayed signal to output an AND signal;
a third select circuit that receives the AND signal and the first delayed signal to select one of the AND signal and the first delayed signal in response to the select signal; and
a third delay circuit that delays a third selected signal provided from the third select circuit to output a third delayed signal in response to the clock signal, the third delayed signal corresponding to the second feedback signal.

14. The apparatus of claim 13, wherein the first through third select circuits correspond to a 2-to-1 multiplexer.

15. The apparatus of claim 13, wherein the first and second logic circuits correspond to an AND gate.

16. The apparatus of claim 13, wherein the first through third delay circuits correspond to a D flip-flop.

17. The apparatus of claim 16, wherein the D flip-flops are triggered by rising edges of the clock signal.

* * * * *